United States Patent
Wei et al.

(10) Patent No.: US 9,774,971 B2
(45) Date of Patent: *Sep. 26, 2017

(54) METHOD FOR MAKING THERMOACOUSTIC DEVICE

(71) Applicants: Tsinghua University, Beijing (CN); HON HAI PRECISION INDUSTRY CO., LTD., New Taipei (TW)

(72) Inventors: Yang Wei, Beijing (CN); Xiao-Yang Lin, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 881 days.

This patent is subject to a terminal disclaimer.

(21) Appl. No.: 13/925,775

(22) Filed: Jun. 24, 2013

(65) Prior Publication Data
US 2014/0137397 A1 May 22, 2014

(30) Foreign Application Priority Data
Nov. 20, 2012 (CN) .................... 2012 1 04714603

(51) Int. Cl.
*H04R 31/00* (2006.01)
*H04R 23/00* (2006.01)
*B82Y 15/00* (2011.01)

(52) U.S. Cl.
CPC ........... *H04R 31/00* (2013.01); *H04R 23/002* (2013.01); *B82Y 15/00* (2013.01); *Y10S 977/742* (2013.01);
(Continued)

(58) Field of Classification Search
CPC ...... H04R 31/00; H04R 23/002; B82Y 15/00; Y10T 29/49005
(Continued)

(56) References Cited

U.S. PATENT DOCUMENTS 7,726,190 B2 6/2010 Matsumoto et al.
7,876,912 B2 1/2011 Liu et al.
(Continued)

FOREIGN PATENT DOCUMENTS

CN 101133320 2/2008
CN 101771920 7/2010
(Continued)

*Primary Examiner* — Peter DungBa Vo
*Assistant Examiner* — Azm Parvez
(74) *Attorney, Agent, or Firm* — Steven Reiss

(57) ABSTRACT

A method for making thermoacoustic device includes following steps. A silicon substrate having a first surface and second surface opposite to the first surface is provided. The first surface is patterned by forming a plurality of grooves substantially oriented along a first direction, wherein the plurality of grooves is spaced from each other, and a bulge is formed between each two adjacent grooves. An insulating layer is coated on the patterned surface. A first electrode and a second electrode are formed on the insulating layer, wherein the first electrode and the second electrode are spaced from each other. A carbon nanotube structure is applied on the insulating layer, wherein the carbon nanotube structure is electrically connected to the first electrode and the second electrode, the carbon nanotube structure is suspended above the plurality of grooves.

9 Claims, 18 Drawing Sheets

(52) U.S. Cl.
CPC ...... *Y10S 977/932* (2013.01); *Y10T 29/49005* (2015.01)

(58) Field of Classification Search
USPC ....... 29/594, 592.1; 977/932, 742, 700, 732; 381/164
See application file for complete search history.

(56) References Cited

U.S. PATENT DOCUMENTS

| | | |
|---|---|---|
| 8,019,100 B2 | 9/2011 | Jiang et al. |
| 8,059,841 B2 | 11/2011 | Jiang et al. |
| 8,208,661 B2 | 6/2012 | Jiang et al. |
| 8,300,855 B2 | 10/2012 | Liu et al. |
| 8,379,885 B2 | 2/2013 | Liu |
| 8,494,187 B2 | 7/2013 | Jiang et al. |
| 8,553,912 B2 | 10/2013 | Wang et al. |
| 2005/0201575 A1 | 9/2005 | Koshida et al. |
| 2006/0043576 A1 | 3/2006 | Lee |
| 2006/0233388 A1 | 10/2006 | Liow et al. |
| 2008/0170727 A1 | 7/2008 | Bachman et al. |
| 2008/0190206 A1 | 8/2008 | Matsumoto et al. |
| 2008/0286938 A1* | 11/2008 | Pu ............... H01L 21/78 438/458 |
| 2009/0167137 A1* | 7/2009 | Liu ............... H01J 1/14 313/306 |
| 2010/0067714 A1 | 3/2010 | Cheng |
| 2010/0086166 A1 | 4/2010 | Jiang et al. |
| 2010/0166232 A1* | 7/2010 | Liu ............... H04R 1/028 381/164 |
| 2010/0203929 A1 | 8/2010 | Skagmo et al. |
| 2010/0260357 A1 | 10/2010 | Liu et al. |
| 2010/0311002 A1 | 12/2010 | Jiang et al. |
| 2011/0033069 A1 | 2/2011 | Liu et al. |
| 2011/0051961 A1* | 3/2011 | Jiang ............ F28D 15/0275 381/164 |
| 2011/0054659 A1 | 3/2011 | Carlson et al. |
| 2011/0147898 A1 | 6/2011 | Hosier et al. |
| 2012/0250905 A1 | 10/2012 | Jiang et al. |
| 2012/0250907 A1 | 10/2012 | Jiang et al. |
| 2012/0250908 A1 | 10/2012 | Jiang et al. |
| 2013/0129119 A1 | 5/2013 | Miyatake et al. |
| 2013/0216074 A1 | 8/2013 | Kon |
| 2014/0137398 A1* | 5/2014 | Wei ............... H04R 23/002 29/594 |

FOREIGN PATENT DOCUMENTS

| | | |
|---|---|---|
| CN | 101783995 | 7/2010 |
| CN | 101820571 | 9/2010 |
| CN | 102157447 | 8/2011 |
| CN | 102307715 | 1/2012 |
| JP | 11-300274 | 11/1999 |
| JP | 2005-57479 | 3/2005 |
| JP | 2005-057495 | 3/2005 |
| JP | 3808493 | 5/2006 |
| JP | 2008-167252 | 7/2008 |
| JP | 2009-141880 | 6/2009 |
| JP | 2010-74831 | 4/2010 |
| JP | 2010-93804 | 4/2010 |
| JP | 2010-288270 | 12/2010 |
| JP | 2011-41269 | 2/2011 |
| JP | 2012-039272 | 2/2012 |
| JP | 2012-39272 | 2/2012 |
| JP | 2012-94942 | 5/2012 |
| JP | 2012-209923 | 10/2012 |
| TW | 209093 | 7/1993 |
| TW | I246735 | 1/2006 |
| TW | M299999 | 10/2006 |
| TW | 200644701 | 12/2006 |
| TW | I273715 | 2/2007 |
| TW | 200725861 | 7/2007 |
| TW | 200743677 | 12/2007 |
| TW | 201002097 | 1/2010 |
| TW | 201018256 | 5/2010 |
| TW | 201029481 | 8/2010 |
| TW | 201043763 | 12/2010 |
| TW | 201118938 | 6/2011 |
| TW | 201125373 | 7/2011 |
| TW | 201143474 | 12/2011 |
| TW | I356396 | 1/2012 |
| TW | 201240480 | 10/2012 |
| TW | 201240486 | 10/2012 |

\* cited by examiner

METHOD FOR MAKING THERMOACOUSTIC DEVICE

RELATED APPLICATIONS

This application claims all benefits accruing under 35 U.S.C. §119 from China Patent Application No. 201210471460.3, filed on Nov. 20, 2012 in the China Intellectual Property Office, the contents of which are hereby incorporated by reference. This application is related to commonly-assigned applications entitled, "THERMOACOUSTICS DEVICE", U.S. patent application Ser. No. 13/925,767, filed Jun. 24, 2013, the contents of the above commonly-assigned applications are hereby incorporated by reference.

BACKGROUND

1. Technical Field

The present disclosure relates to thermoacoustic devices and method for making the same.

2. Description of Related Art

An acoustic device generally includes an electrical signal output device and a loudspeaker. The electrical signal output device inputs electrical signals into the loudspeaker. The loudspeaker receives the electrical signals and then transforms them into sounds.

There are different types of loudspeakers that can be categorized according by their working principles, such as electro-dynamic loudspeakers, electromagnetic loudspeakers, electrostatic loudspeakers and piezoelectric loudspeakers.

Thermoacoustic effect is a conversion of heat to acoustic signals. The thermoacoustic effect is distinct from the mechanism of the conventional loudspeaker, which the pressure waves are created by the mechanical movement of the diaphragm. When signals are inputted into a sound wave generator, heating is produced in the sound wave generator according to the variations of the signal and/or signal strength. Heat is propagated into surrounding medium. The heating of the medium causes thermal expansion and produces pressure waves in the surrounding medium, resulting in sound wave generation. Such an acoustic effect induced by temperature waves is commonly called "the thermoacoustic effect".

Carbon nanotubes (CNT) are a novel carbonaceous material having extremely small size and extremely large specific surface area. Carbon nanotubes have received a great deal of interest since the early 1990s, and have interesting and potentially useful electrical and mechanical properties, and have been widely used in a plurality of fields. The carbon nanotube film used in the thermoacoustic device has a large specific surface area, and extremely small heat capacity per unit area that make the sound wave generator emit sound audible to humans. However, the carbon nanotube film used in the thermoacoustic device has a small thickness and a large area, and is likely to be damaged by the external forces applied thereon.

What is needed, therefore, is to provide a thermoacoustic device for solving the problem discussed above.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present thermoacoustic devices and method for making the same.

Figure 1:
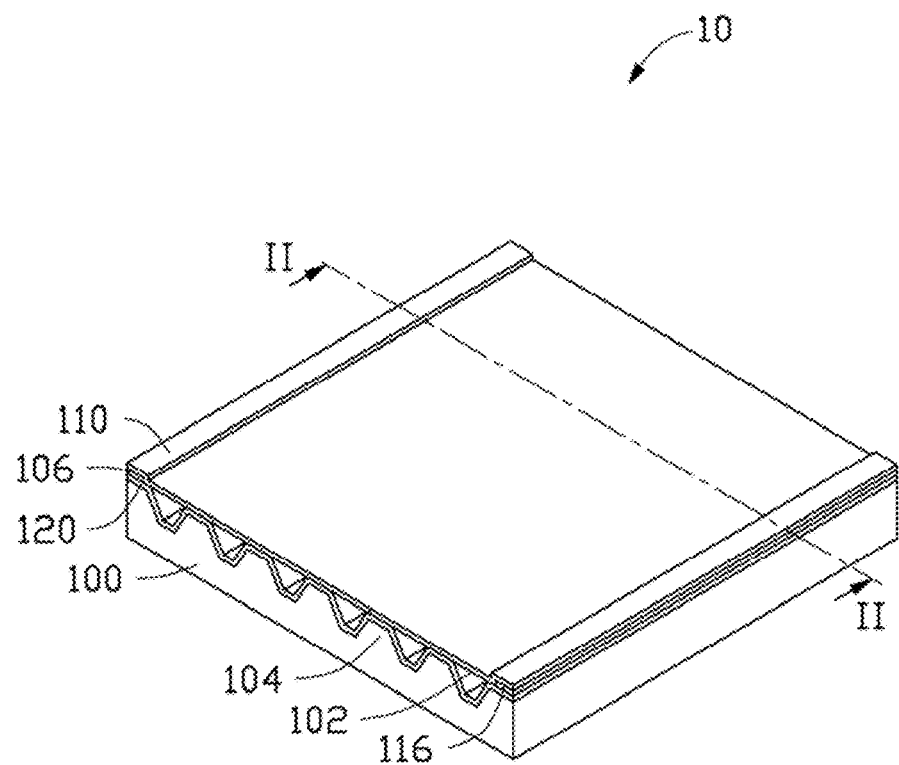
FIG. 1 is a schematic view of one embodiment of a thermoacoustic device.
Figure 2:
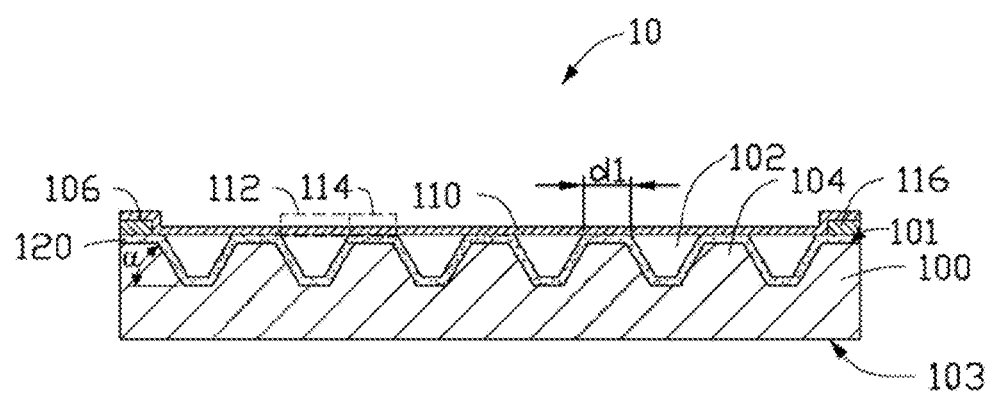
FIG. 2 is a cross-sectional view, along a line II-II of FIG. 1.

Referring to FIG. 1, a thermoacoustic device 10 includes a substrate 100, a sound wave generator 110, an insulating layer 120, a first electrode 106, and a second electrode 116. The first electrode 106 and the second electrode 116 are spaced from each other and electrically connected to the sound wave generator 110. The substrate 100 includes a first surface 101 and a second surface 103 opposite to the first surface 101. The first surface 101 defines a plurality of grooves 102, and a bulge 104 is formed between the adjacent two grooves 102. The insulating layer 120 is located on the first surface 101 and continuously attached on the plurality of grooves 102 and the bulge 104. The sound wave generator 110 is located on the insulating layer 120 and insulated from the substrate 100. The sound wave generator 110 defines a first portion 112 and a second portion 114. The first portion 112 is suspended on the plurality of grooves 102. The second portion 114 is attached on the bulge 104.

The substrate 100 is a flake-like structure. The shape of the substrate 100 can be circular, square, rectangular or other geometric figure. The resistance of the substrate 100 is greater than the resistance of the sound wave generator 110 to avoid a short through the substrate 100. The substrate 100 can have a good thermal insulating property, thereby preventing the substrate 100 from absorbing the heat generated by the sound wave generator 110. The material of the substrate 100 can be single crystal silicon or multicrystalline silicon. The size of the substrate 100 ranges from about 25 square millimeters to about 100 square millimeters. In one embodiment, the substrate 100 is single crystal silicon with a thickness is about 0.6 millimeters, and a length of each side of the substrate 100 is about 8 millimeters.

The plurality of grooves 102 can be uniformly dispersed on the first surface 101 such as dispersed in an array. The plurality of grooves 102 can also be randomly dispersed. In one embodiment, the plurality of grooves 102 extends along the same direction, and spaced from each other with a certain distance. The shape of the groove 102 can be a through hole, a blind groove (i.e., a depth of the groove 102 is less than a thickness of the substrate 100), a blind hole. Each of the plurality of grooves 102 includes a bottom and a sidewall adjacent to the bottom. The first portion 112 is spaced from the bottom and the sidewall.

A depth of the groove 102 can range from about 100 micrometers to about 200 micrometers. The sound waves reflected by the bottom surface of the blind grooves may have a superposition with the original sound waves, which may lead to an interference cancellation. To reduce this impact, the depth of the blind grooves that can be less than about 200 micrometers. In another aspect, when the depth of the blind grooves is less than 100 micrometers, the heat generated by the sound wave generator 110 would be dissipated insufficiently. To reduce this impact, the depth of the blind grooves and holes can be greater than 100 micrometers.

The plurality of grooves 102 can parallel with each other and extend along the same direction. A distance $d_1$ between adjacent two grooves 102 can range from about 20 micrometers to about 200 micrometers. Thus the first electrode 106 and the second electrode 116 can be printed on the substrate 100 via nano-imprinting method. A cross section of the groove 102 along the extending direction can be V-shaped, rectangular, or trapezoid. In one embodiment, a width of the groove 102 can range from about 0.2 millimeters to about 1 micrometer. Thus sound wave generator 110 can be prevented from being broken. Furthermore, a driven voltage of the sound wave generator 110 can be reduced to lower than 12V. In one embodiment, the driven voltage of the sound wave generator 110 is lower than or equal to 5V. In one embodiment, the shape of the groove 102 is trapezoid. An angle α is defined between the sidewall and the bottom. The angle α is equal to the crystal plane angle of the substrate 100. In one embodiment, the width of the groove 102 is about 0.6 millimeters, the depth of the groove 102 is about 150 micrometers, the distance $d_1$ between adjacent two grooves 102 is about 100 micrometers, and the angle α is about 54.7 degrees.

The insulating layer 120 can be a single-layer structure or a multi-layer structure. In one embodiment, the insulating layer 120 can be merely located on the plurality of bulges 104. In another embodiment, the insulating layer 120 is a continuous structure, and attached on the entire first surface 101. The insulating layer 120 covers the plurality of grooves 102 and the plurality of bulges 104. The sound wave generator 110 is insulated from the substrate 100 by the insulating layer 120. In one embodiment, the insulating layer 120 is a single-layer structure and covers the entire first surface 101.

The material of the insulating layer 120 can be $SiO_2$, $Si_3N_4$, or combination of them. The material of the insulating layer 120 can also be other insulating materials. A thickness of the insulating layer 120 can range from about 10 nanometers to about 2 micrometers, such as 50 nanometers, 90 nanometers, and 1 micrometer. In one embodiment, the thickness of the insulating layer is about 1.2 micrometers.

The sound wave generator 110 is located on the first surface 101 and insulated from the substrate 100 by the insulating layer 120. The first portion 112 is suspended above the plurality of grooves 102, and the second portion 114 is attached on the plurality of bulges 104. The second portion 114 can be attached on the plurality of bulges 104 via an adhesive layer or adhesive particles (not shown).

The sound wave generator 110 has a very small heat capacity per unit area. The heat capacity per unit area of the sound wave generator 110 is less than $2 \times 10^{-4}$ J/cm$^2$*K. The sound wave generator 110 can be a conductive structure with a small heat capacity per unit area and a small thickness. The sound wave generator 110 can have a large specific surface area for causing the pressure oscillation in the surrounding medium by the temperature waves generated by the sound wave generator 110. The sound wave generator 110 can be a free-standing structure. The term "free-standing" includes, but is not limited to, a structure that does not have to be supported by a substrate and can sustain the weight of it when it is hoisted by a portion thereof without any significant damage to its structural integrity. The suspended part of the sound wave generator 110 will have more sufficient contact with the surrounding medium (e.g., air) to have heat exchange with the surrounding medium from both sides of the sound wave generator 110. The sound wave generator 110 is a thermoacoustic film.

The sound wave generator 110 can be or include a free-standing carbon nanotube structure. The carbon nanotube structure may have a film structure. The thickness of the carbon nanotube structure may range from about 0.5 nanometers to about 1 millimeter. The carbon nanotubes in the carbon nanotube structure are combined by van der Waals attractive force therebetween. The carbon nanotube structure has a large specific surface area (e.g., above 30 m$^2$/g). The larger the specific surface area of the carbon nanotube structure, the smaller the heat capacity per unit area will be. The smaller the heat capacity per unit area, the higher the sound pressure level of the sound produced by the sound wave generator 110.

The carbon nanotube structure can include at least one carbon nanotube film, a plurality of carbon nanotube wires, or a combination of carbon nanotube film and the plurality of carbon nanotube wires. The carbon nanotube film can be a drawn carbon nanotube film formed by drawing a film from a carbon nanotube array that is capable of having a film drawn therefrom. The heat capacity per unit area of the drawn carbon nanotube film can be less than or equal to about $1.7 \times 10^{-6}$ J/cm$^2$*K. The drawn carbon nanotube film can have a large specific surface area (e.g., above 100 m$^2$/g). In one embodiment, the drawn carbon nanotube film has a specific surface area in the range of about 200 m$^2$/g to about 2600 m$^2$/g. In one embodiment, the drawn carbon nanotube film is a pure carbon nanotube structure consisting of a plurality of carbon nanotubes, and has a specific weight of about 0.05 g/m$^2$.

The thickness of the drawn carbon nanotube film can be in a range from about 0.5 nanometers to about 100 nanometers. When the thickness of the drawn carbon nanotube film is small enough (e.g., smaller than 10 μm), the drawn carbon nanotube film is substantially transparent.

Figure 3:
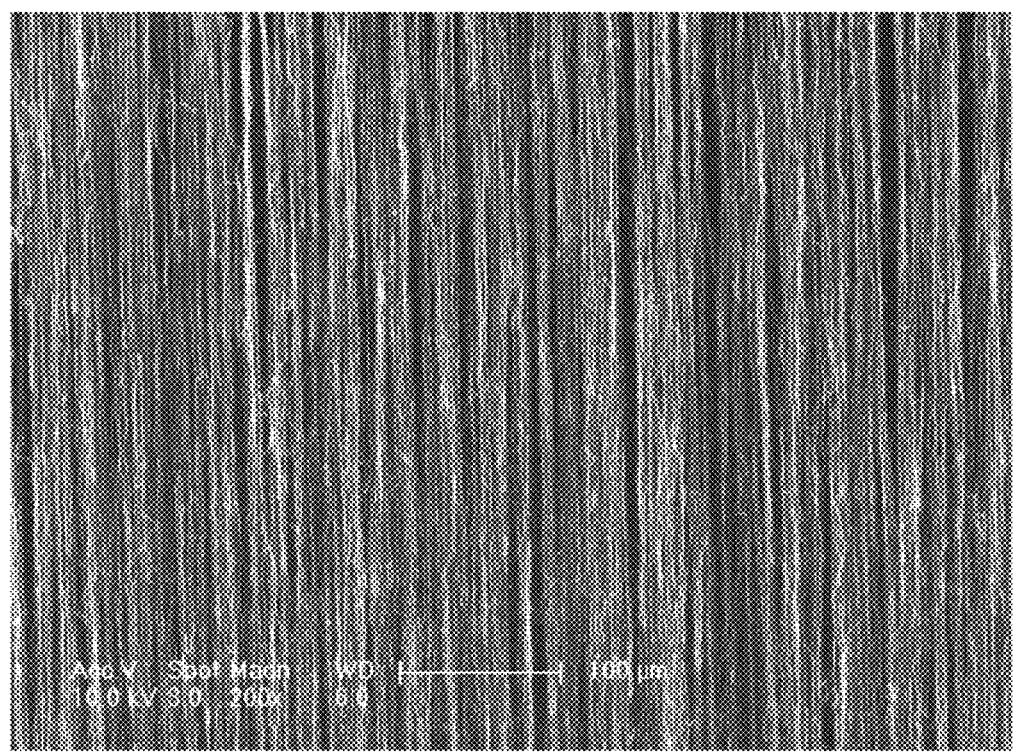
FIG. 3 is a schematic view of a carbon nanotube film in the thermoacoustic device of FIG. 1.

Referring to FIG. 3, the drawn carbon nanotube film includes a plurality of successive and oriented carbon nanotubes joined end-to-end by van der Waals attractive force therebetween. The carbon nanotubes in the drawn carbon nanotube film can be substantially oriented along a single direction and substantially parallel to the surface of the carbon nanotube film. Furthermore, an angle β can exist between the oriented direction of the carbon nanotubes in the drawn carbon nanotube film and the extending direction of the plurality of grooves 102, and $0 \leq \beta \leq 90°$. In one embodiment, the oriented direction of the plurality of carbon nanotubes is perpendicular to the extending direction of the plurality of grooves 102. As can be seen in FIG. 3, some variations can occur in the drawn carbon nanotube film. The drawn carbon nanotube film is a free-standing film. The drawn carbon nanotube film can be formed by drawing a film from a carbon nanotube array that is capable of having a carbon nanotube film drawn therefrom. Furthermore, the plurality of carbon nanotubes is substantially parallel with the first surface 101.

The carbon nanotube structure can include more than one carbon nanotube films. The carbon nanotube films in the carbon nanotube structure can be coplanar and/or stacked. Coplanar carbon nanotube films can also be stacked one upon other coplanar films. Additionally, an angle can exist between the orientation of carbon nanotubes in adjacent films, stacked and/or coplanar. Adjacent carbon nanotube films can be combined by only the van der Waals attractive force therebetween without the need of an additional adhesive. The number of the layers of the carbon nanotube films is not limited. However, as the stacked number of the carbon nanotube films increases, the specific surface area of the carbon nanotube structure will decrease. A large enough specific surface area (e.g., above 30 $m^2/g$) must be maintained to achieve an acceptable acoustic volume. An angle θ between the aligned directions of the carbon nanotubes in the two adjacent drawn carbon nanotube films can range from about 0 degrees to about 90 degrees. Spaces are defined between two adjacent carbon nanotubes in the drawn carbon nanotube film. When the angle θ between the aligned directions of the carbon nanotubes in adjacent drawn carbon nanotube films is larger than 0 degrees, a microporous structure is defined by the carbon nanotubes in the sound wave generator 110. The carbon nanotube structure in an embodiment employing these films will have a plurality of micropores. Stacking the carbon nanotube films will add to the structural integrity of the carbon nanotube structure.

In some embodiments, the sound wave generator 110 is a single drawn carbon nanotube film drawn from the carbon nanotube array. The drawn carbon nanotube film has a thickness of about 50 nanometers, and has a transmittance of visible lights in a range from 67% to 95%.

In other embodiments, the sound wave generator 110 can be or include a free-standing carbon nanotube composite structure. The carbon nanotube composite structure can be formed by depositing at least a conductive layer on the outer surface of the individual carbon nanotubes in the above-described carbon nanotube structure. The carbon nanotubes can be individually coated or partially covered with conductive material. Thereby, the carbon nanotube composite structure can inherit the properties of the carbon nanotube structure such as the large specific surface area, the high transparency, the small heat capacity per unit area. Further, the conductivity of the carbon nanotube composite structure is greater than the pure carbon nanotube structure. Thereby, the driven voltage of the sound wave generator 110 using a coated carbon nanotube composite structure will be decreased. The conductive material can be placed on the carbon nanotubes by using a method of vacuum evaporation, spattering, chemical vapor deposition (CVD), electroplating, or electroless plating.

The first electrode 106 and the second electrode 116 are in electrical contact with the sound wave generator 110, and input electrical signals into the sound wave generator 110.

The first electrode 106 and the second electrode 116 are made of conductive material. The shape of the first electrode 106 or the second electrode 116 is not limited and can be lamellar, rod, wire, and block among other shapes. A material of the first electrode 106 or the second electrode 116 can be metals, conductive adhesives, carbon nanotubes, and indium tin oxides among other conductive materials. The first electrode 106 and the second electrode 116 can be metal wire or conductive material layers, such as metal layers formed by a sputtering method, or conductive paste layers formed by a method of screen-printing.

The first electrode 106 and the second electrode 116 can be electrically connected to two terminals of an electrical signal input device (such as a MP3 player) by a conductive wire. Thereby, electrical signals output from the electrical signal device can be input into the sound wave generator 110 through the first electrodes 106, and the second electrode 116.

In one embodiment, the sound wave generator 110 is a drawn carbon nanotube film drawn from the carbon nanotube array, and the carbon nanotubes in the carbon nanotube film are aligned along a direction from the first electrode 106 to the second electrode 116. The first electrode 106 and the second electrode 116 can both have a length greater than or equal to the carbon nanotube film width.

Furthermore, a heat sink (not shown) can be located on the substrate 100, and the heat produced by the sound wave generator 110 can be transferred into the heat sink and the temperature of the sound wave generator 110 can be reduced.

The sound wave generator 110 is driven by electrical signals and converts the electrical signals into heat energy. The heat capacity per unit area of the carbon nanotube structure is extremely small, and thus, the temperature of the carbon nanotube structure can change rapidly. Thermal waves, which are propagated into surrounding medium, are obtained. Therefore, the surrounding medium, such as ambient air, can be heated at a frequency. The thermal waves produce pressure waves in the surrounding medium, resulting in sound wave generation. In this process, it is the thermal expansion and contraction of the medium in the vicinity of the sound wave generator 110 that produces sound. The operating principle of the sound wave generator 110 is the "optical-thermal-sound" conversion.

The thermoacoustic device 10 has following advantages. First, the width of the groove 102 is equal to or greater than 0.2 millimeters and smaller than or equal to 1 millimeter, thus the carbon nanotube structure can be effectively protected from being broken. Second, the material of the substrate 100 is silicon material, thus the thermoacoustic device 10 can be easily fabricated via traditional process, and the size of the thermoacoustic device 10 can be reduced, and small-sized thermoacoustic speaker (such as smaller than 1 square centimeters) can be obtained. Third, the substrate 100 has good thermal conductivity, and the heat sink can be omitted. Fourth, the thermoacoustic device 10 can be fabricated with traditional semiconductor manufacturing process, thus the thermoacoustic device 10 can be easily integrated with other elements such as IC chip, and suitable for small-sized device.

Figure 4:
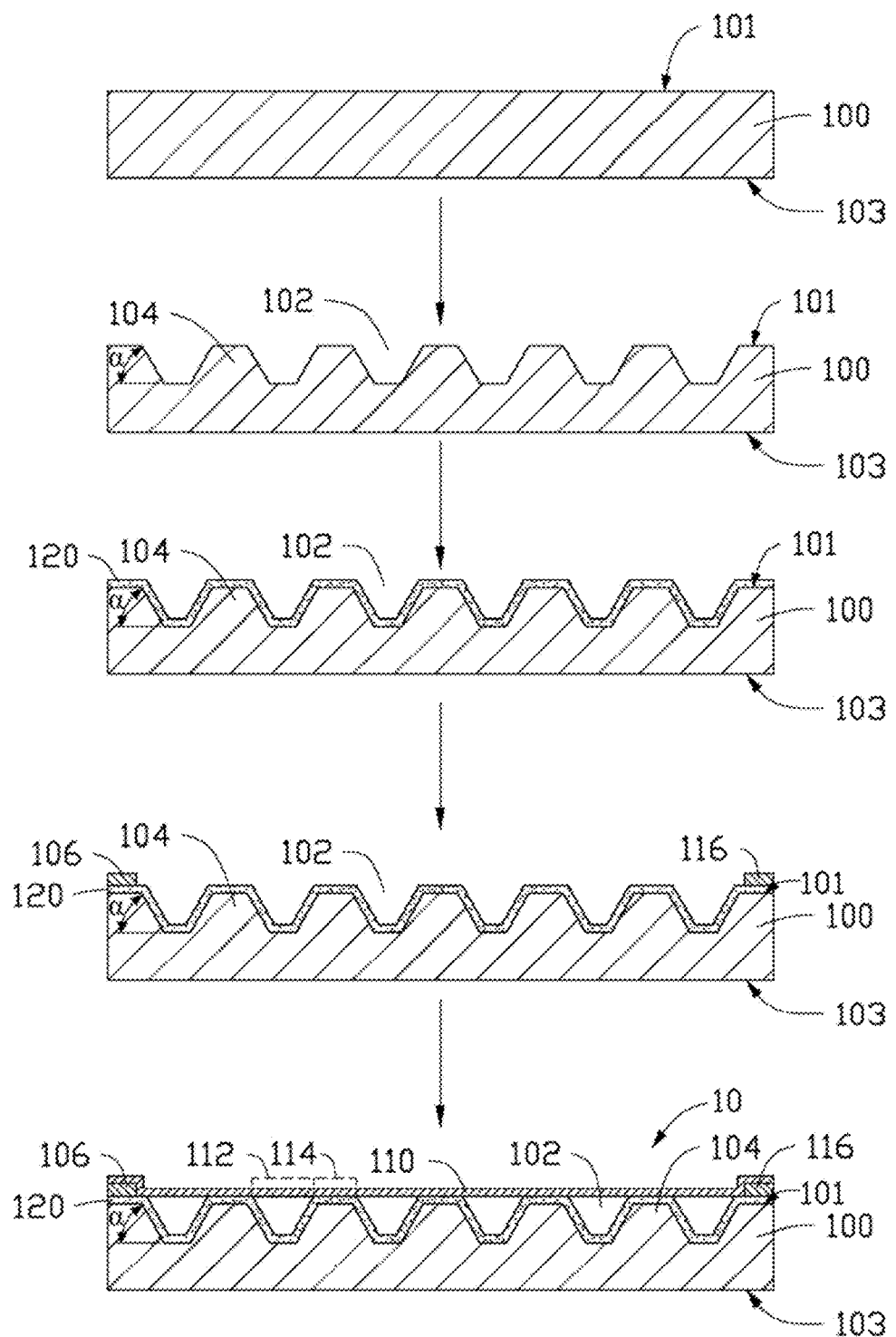
FIG. 4 is a flowchart of one embodiment of a method for making the thermoacoustic device of FIG. 1.

Referring to FIG. 4, one embodiment of a method for making thermoacoustic device 10 including following steps:

(S11) providing a substrate 100 with a patterned surface;

(S12) forming an insulating layer 120 on the patterned surface of the substrate 100;

(S13) locating a first electrode 106 and a second electrode 116 on the insulating layer 120, wherein the first electrode 106 and the second electrode 116 are spaced from each other; and (S14) placing a sound wave generator 110 on the insulating layer 120 and electrically connected to the first electrode 106 and the second electrode 116.

In step (S11), the substrate 100 includes a first surface 101 and a second surface 103 opposite to the first surface 101. The first surface 101 defines a plurality of grooves 102, and a bulge 104 is formed between each adjacent two grooves 102. Thus the first surface 101 is patterned by the plurality of grooves 102. The plurality of grooves 102 can be etched via dry etching or wet etching. In one embodiment, the substrate 100 is etched by following substeps:

(S111) placing a patterned mask layer (not shown) on the substrate 100;

(S112) etching the substrate 100 to form a patterned surface; and (S113) removing the mask layer.

In step (S111), the mask layer defines a plurality of holes. The substrate 100 is exposed through the plurality of holes. The shape of the hole can be circular, square, or rectangular. The material of the mask layer can be selected according to the substrate 100, such as silicon dioxide, silicon nitride, silicon oxynitride, or titanium dioxide. The mask layer can protect one part of the substrate 100 which is sheltered by the mask layer from being corrupted by the solution. In one embodiment, the shape of the hole is rectangular extending along the same direction, and a width of the hole ranges from about 0.2 millimeters to about 1 millimeter. A distance between adjacent two holes ranges from about 20 micrometers to about 200 micrometers.

In step (S112), the substrate 100 can be etched by an etching solution. The etching solution can be an alkaline solution. In one embodiment, the etching solution is potassium hydroxide in a temperature about 80° C. During etching process, the plurality of grooves 102 is formed in the substrate 100. Because the mask layer defines a plurality of holes extending along the same direction, thus the plurality of grooves 102 is extending along the same direction. The width of each of the plurality of grooves 102 ranges from about 0.2 millimeters to about 1 millimeter. The distance between adjacent two grooves 102 ranges from about 20 micrometers to about 200 micrometers.

Furthermore, because the material of the substrate 100 is silicon, thus the cross section of the groove 102 depends on the crystal plane angle silicon. In one embodiment, the cross section of the groove 102 is in a shape of trapezium.

In step (S113), the mask layer can be removed by dissolved in a solution. In one embodiment, the mask layer is removed by hydrofluoric acid.

In step (S12), the insulating layer 120 can be a single-layer structure deposited on the substrate 100 via physical vapor deposition or chemical vapor deposition. The insulating layer 120 can be only deposited on the plurality of bulge 104, thus the insulating layer 120 is discontinuous. In one embodiment, the insulating layer 120 is continuous and directly deposited on the entire first surface 101 of the substrate 100.

In step (S13), the first electrode 106 and the second electrode 116 are located apart from each other on two opposite sides of the substrate 100. In one embodiment, the first electrode 106 and the second electrode 116 are deposited on the insulating layer 120 which is deposited on the bugle 104. The first electrode 106 and the second electrode 116 can be linear structure extending parallel with the plurality of bulges 104. In one embodiment, the first electrode 106 and the second electrode 116 are deposited on the bulges 104 via imprinting method.

In step (S14), the sound wave generator 110 can be located on the substrate 100 by following substeps:

(S141) providing a carbon nanotube film;

(S142) applying the carbon nanotube film on the insulating layer 120, wherein the carbon nanotube film is suspended above the plurality of grooves 102.

In step (S141), the carbon nanotube film can be a drawn carbon nanotube film drawn from a carbon nanotube array. The drawn carbon nanotube film can be directly attached on the substrate 100. The drawn carbon nanotube film includes a plurality of carbon nanotubes substantially oriented along the same direction. The oriented direction of the plurality of carbon nanotubes is intersected with the extending direction of the plurality of grooves 102. In one embodiment, the oriented direction of the plurality of carbon nanotubes is perpendicular to the extending direction of the plurality of grooves 102.

In step (S142), the carbon nanotube film defines a first part and a second part. In one embodiment, the first part of the carbon nanotube film is suspended on the plurality of grooves 102, and the second part of the carbon nanotube film is attached on the first electrode 106 and the second electrode 116.

Furthermore, a fixed element (now shown) can be located on the sound wave generator 110 to fix the sound wave generator 110. The fixed element can be attached on the sound wave generator 110 by imprinting or coating method. In one embodiment, the fixed element is metallic fibers fixed on the sound wave generator 110 and the substrate 100.

In one embodiment, the first electrode 106 and the second electrode 116 can be applied after locating the carbon nanotube film on the insulating layer 120. The first electrode 106 and the second electrode 116 is attached on and electrically connected to the carbon nanotube film. The plurality of carbon nanotubes in the carbon nanotube film extends from the first electrode 106 to the second electrode 116. Furthermore, the carbon nanotube film can be firmly fixed on the substrate 100 by the first electrode 106 and the second electrode 116.

Figure 5:
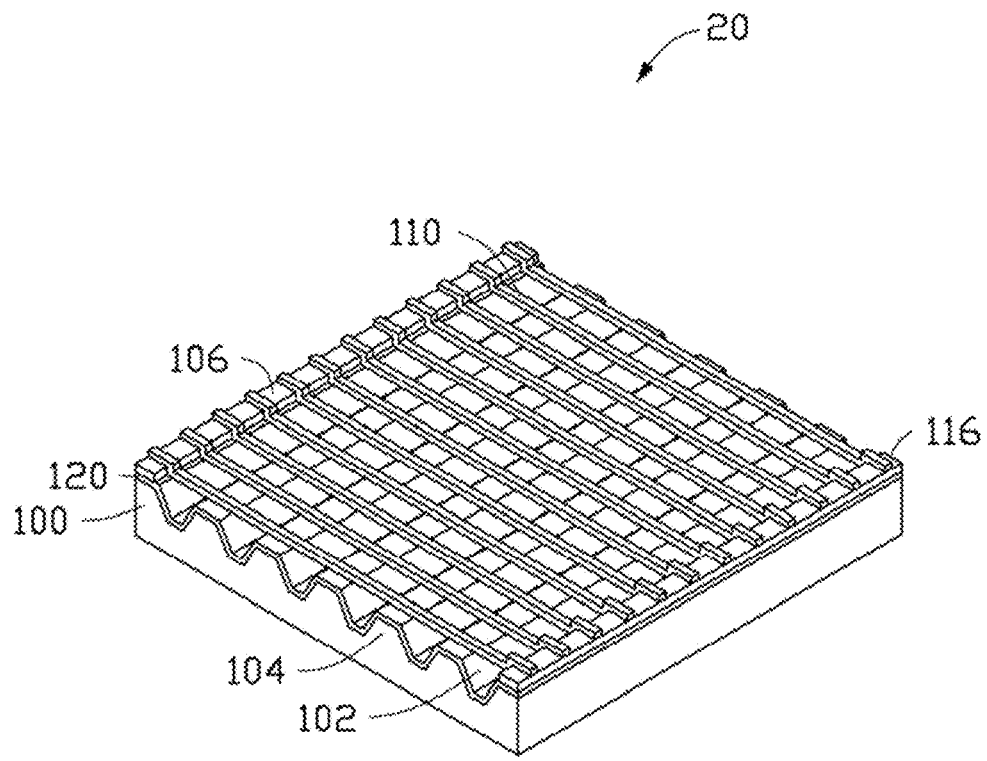
FIG. 5 is a schematic view of another embodiment of a thermoacoustic device.

Referring to FIG. 5, one embodiment of a thermoacoustic device 20 includes a substrate 100, a sound wave generator 110, an insulating layer 120, a first electrode 106 and a second electrode 116. The first electrode 106 and the second electrode 116 are spaced from each other and electrically connected to the sound wave generator 110. The thermoacoustic device 20 is similar to the thermoacoustic device 10, except that the sound wave generator 110 includes a plurality of carbon nanotube wires parallel with and spaced from each other.

The plurality of carbon nanotube wires is intersected with the plurality of grooves 102. In one embodiment, the plurality of carbon nanotube wires is perpendicular to the plurality of grooves 102. Each of the plurality of carbon nanotube wires includes a plurality of carbon nanotubes, and the extending direction of the plurality of carbon nanotubes is parallel with the carbon nanotube wire. The plurality of carbon nanotube wires is suspended on the plurality of grooves 102.

A distance between adjacent two carbon nanotube wires ranges from about 1 micrometers to about 200 micrometers, such as 50 micrometers, 150 micrometers. In one embodiment, the distance between adjacent tow carbon nanotube wires is about 120 micrometers. A diameter of the carbon nanotube wire ranges from about 0.5 nanometers to about 100 micrometers. In one embodiment, the distance between adjacent two carbon nanotube wires is about 120 micrometers, and the diameter of the carbon nanotube wire is about 1 micrometer.

Figure 6:
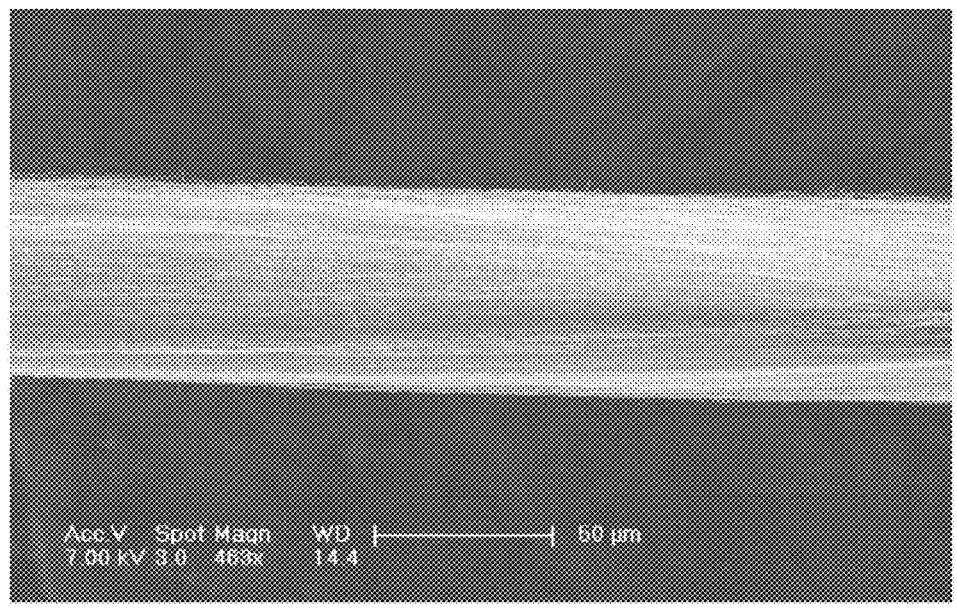
FIG. 6 shows a scanning electron microscope (SEM) image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. Referring to FIG. 6, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nm to about 100 μm.

Figure 7:
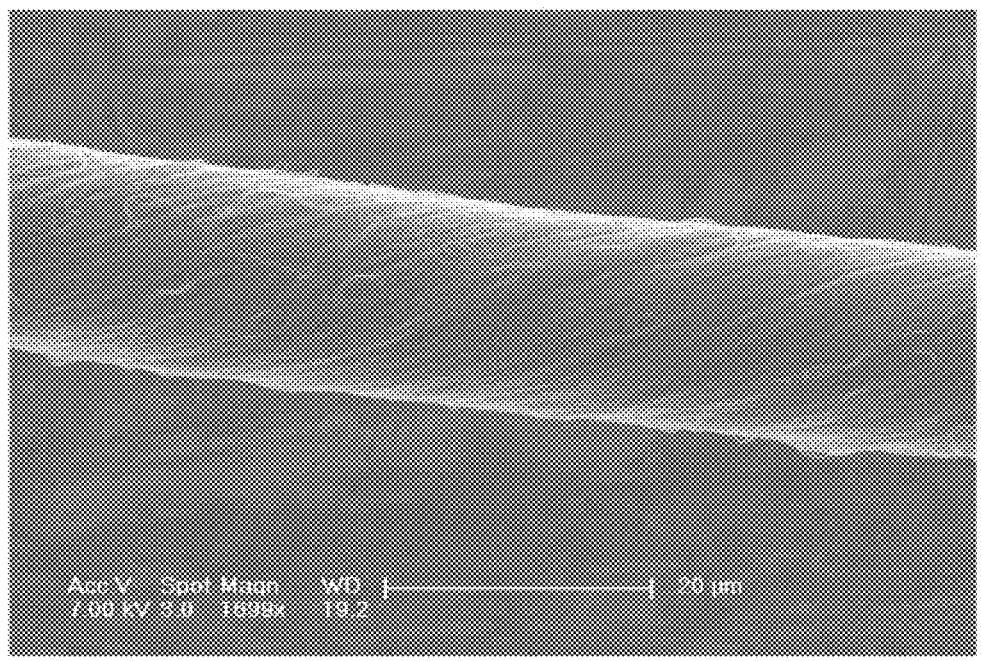
FIG. 7 shows a SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 7, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased. The deformation of the sound wave generator 110 can be avoid during working, and the distortion degree of the sound wave can be reduced.

A method of one embodiment of making thermoacoustic device 20 includes following steps:

(S21) providing a substrate 100 with a patterned surface, wherein the patterned surface defines a plurality of grooves 102 spaced from each other;

(S22) applying an insulating layer 120 on the patterned surface;

(S23) forming a first electrode 106 and a second electrode 116 on the insulating layer 120, and the first electrode 106 is spaced from the second electrode 116;

(S24) applying a carbon nanotube film electrically connected to the first electrode 106 and the second electrode 116; and (S25) forming a plurality of carbon nanotube wires parallel with each other by treating the carbon nanotube film.

The method of making thermoacoustic device 20 is similar to that of making thermoacoustic device 10, except further comprises a step of treating the carbon nanotube film.

In step (S25), the carbon nanotube film can be treated by following substeps:

(S251) forming a plurality of carbon nanotube belts by cutting the carbon nanotube film; and (S252) shrinking the plurality of carbon nanotube belts.

In step (S251), the carbon nanotube film can be cut with a laser device (not shown). The laser device emits a pulse laser beam. The laser device can be an argon ion laser or a carbon dioxide laser. The power of the laser device can range from about 1 watt to about 100 watts. In one embodiment, the laser device can have a power of approximately 12 watts. The laser beam is irradiated on the carbon nanotube film, and a laser spot can be formed on the carbon nanotube film. The laser spot can be round in shape and have a diameter ranging from about 1 micrometer to about 5 millimeters (e.g. about 20 micrometers). It is noteworthy that the laser beam can be focused by a lens. It is also noteworthy that a number of laser devices can be adopted to adjust the shape of the laser spot. In one embodiment, the laser spot can have a strip shape having a width ranging from about 1 micrometer to about 5 millimeters.

The carbon nanotube film and the laser beam are controlled to move relative to each other so the laser spot moves relative to the carbon nanotube film. In one embodiment, the irradiated direction of the laser beam is substantially perpendicular to the carbon nanotube film. At the same time, the laser spot moves along a direction which perpendicular to oriented direction of the carbon nanotubes of the carbon nanotube film. The oriented direction of the carbon nanotubes of the carbon nanotube film is defined as direction X, thus the laser spot moves substantially parallel with the direction X.

In one embodiment, the carbon nanotube film can be fixed, and the laser device can be moved to irradiate selected portions of the carbon nanotube film along a scanning path. In another embodiment, the laser device can be fixed, and the carbon nanotube film can be moved relative to the laser beam so that some portions of the carbon nanotube film on the scanning path can be irradiated by the laser beam. In one embodiment, the carbon nanotube film and the laser device can be fixed, and the emergence angle of the laser beam can be adjusted to cause the laser beam moving relative to the carbon nanotube film, so the laser spot can be projected on the selected portions of the carbon nanotube film. The laser spot cuts the carbon nanotube film with a certain interval along the oriented direction of the carbon nanotubes. The distance can be substantially the same, During the process of cutting the carbon nanotube film, a plurality of carbon nanotube belt is formed. The plurality of carbon nanotube belts is substantially parallel with each other. The plurality of carbon nanotube belts can have a substantially uniform width. The width of the carbon nanotube belt can range from about 10 micrometers to about 50 micrometers to avoid broken or fracture during shrinking the carbon nanotube belt. Microscopically, some two or more adjacent carbon nanotubes are still joined end to end in each carbon nanotube belt after the carbon nanotube film being cut. The carbon nanotubes are substantially parallel with each other.

Figure 8:
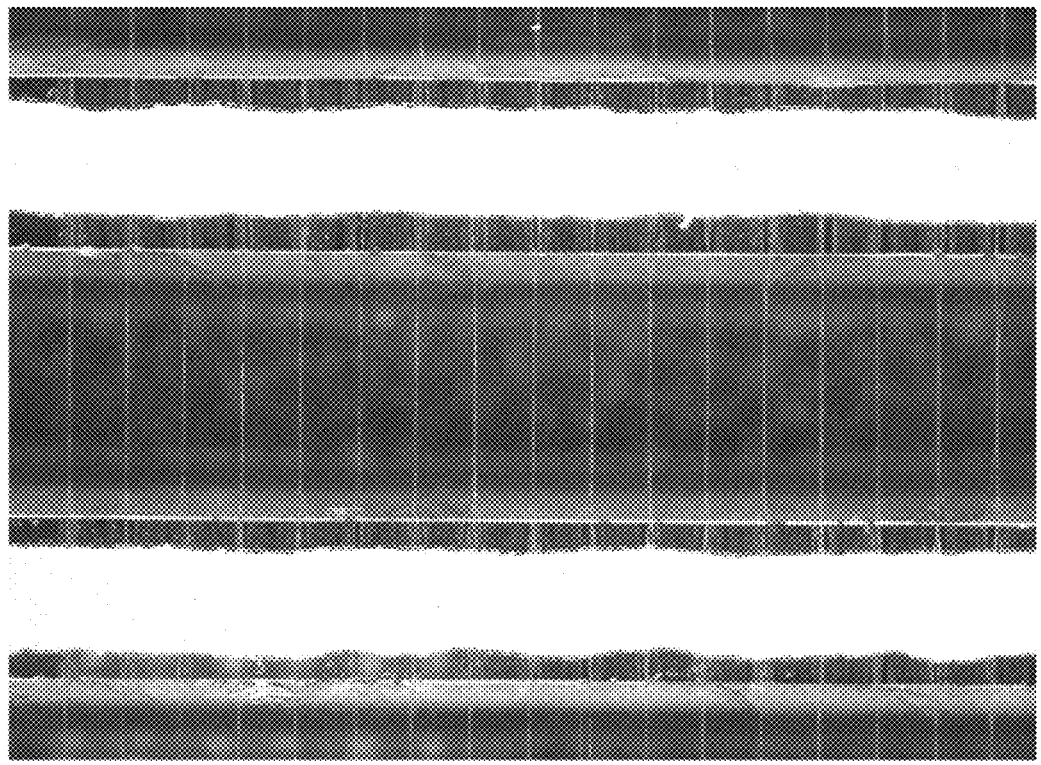
FIG. 8 shows a photomicrograph of a carbon nanotube wire soaked by an organic solution.

In step (S252), the plurality of carbon nanotube belts can be shrunk by dipping organic solvent. The plurality of carbon nanotube belts can also be immersed into the organic solvent. Referring to FIG. 8, the plurality of carbon nanotube belts is shrunk to form the plurality of carbon nanotube wires (the dark portion is the substrate 100, and the white portions are the first electrode 106 and the second electrode 116). The two opposite ends of the plurality of carbon nanotube wires are electrically connected to the first electrode 106 and the second electrode 116. The diameter of the carbon nanotube wires ranges from about 0.5 micrometers to about 3 micrometers. In one embodiment, the diameter of the carbon nanotube wire is about 1 micrometer, and the distance between adjacent two carbon nanotube wires is about 120 micrometers.

After treating the carbon nanotube film, the driven voltage between the first electrode 106 and the second electrode 116 can be reduced. Furthermore, during shrinking process, a part of the plurality of carbon nanotube belts attached on the plurality of bulges 104 will not be shrunk by the organic solvent. Thus after being shrunk, this part of the plurality of carbon nanotube wires can be firmly fixed on the bulges 104, and electrically connected to the first electrode 106 and the second electrode 116.

Figure 9:
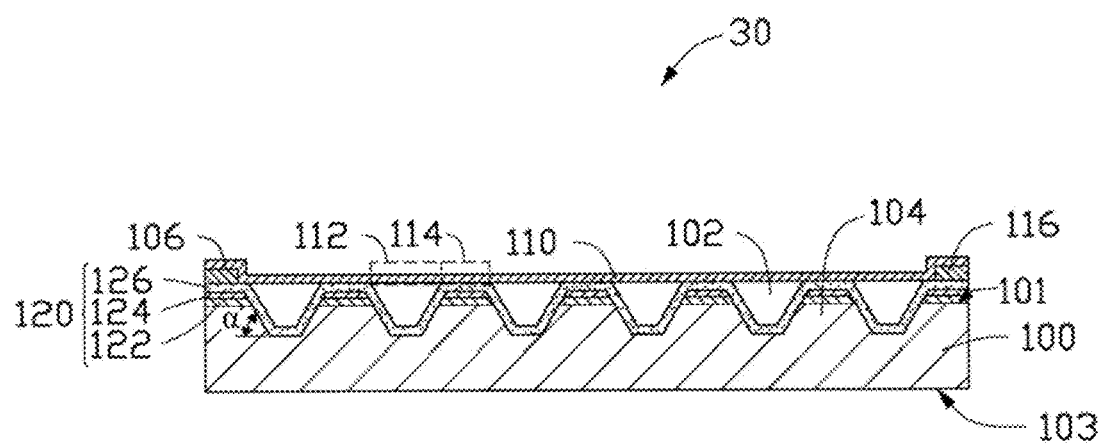
FIG. 9 is a schematic view of another embodiment of a thermoacoustic device.

Referring to FIG. 9, a thermoacoustic device 30 includes a substrate 100, a sound wave generator 110, an insulating layer 120, a first electrode 106, and a second electrode 116. The first electrode 106 and the second electrode 116 are spaced from each other and electrically connected to the sound wave generator 110. The substrate 100 includes a first surface 101 and a second surface 103, opposite to the first surface 101. The first surface 101 defines a plurality of grooves 102, and a bulge 104 is formed between the adjacent two grooves 102. The insulating layer 120 is a multi-layer structure and located on the first surface 101. The sound wave generator 110 is located on the insulating layer 120 and insulated from the substrate 100. The sound wave generator 110 defines a first portion 112 and a second portion 114. The first portion 112 is suspended on the plurality of grooves 102. The second portion 114 is attached on the bulge 104.

The structure of the thermoacoustic device 30 is similar to that of the thermoacoustic device 10, except that the insulating layer 120 is a multi-layer structure. The insulating layer 120 can be merely located on the plurality of bulges 104. The insulating layer 120 can also coated on entire the first surface 101. The insulating layer 120 includes a first insulating layer 122, a second insulating layer 124, and a second insulating layer 126 stacked on the substrate 100 in that sequence. In one embodiment, the first insulating layer 122 and the second insulating layer 124 are merely coated on the plurality of bulges 104, and the first insulating layer 122 covers the entire first surface 101.

The insulating material of the first insulating layer 122, the second insulating layer 124, and the third insulating layer 126 can be same or different. The thickness of each sub-layer of the insulating layer 120 can be in a range from about 10 nanometers to about 1 micrometer. In one embodiment, the material of the first insulating layer 122 comprises silicon with a thickness about 100 nanometers, the material of the second insulating layer 124 comprises silicon nitride with a thickness about 90 nanometers, and the material of the third insulating layer 126 comprises silicon dioxide with a thickness about 1 micrometer. The multi-layer insulating layer 120 can absolutely insulate the substrate 100 from the sound wave generator 110, and reduce the oxidation of the substrate 100 during fabricating process.

Figure 10:
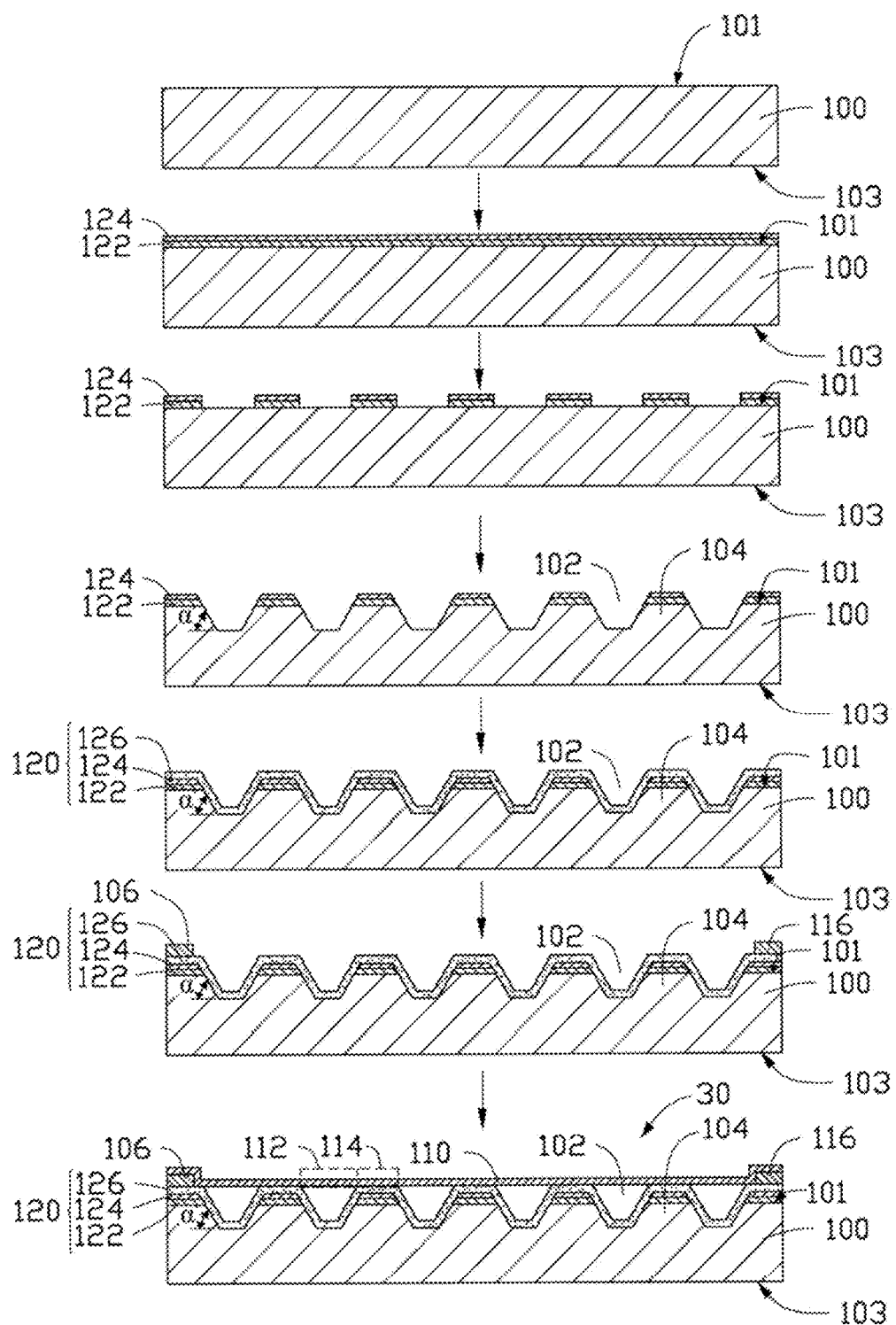
FIG. 10 is a flowchart of one embodiment of a method for making the thermoacoustic device of FIG. 9.

Referring to FIG. 10, one embodiment of a method for making thermoacoustic device 30 includes following steps:

(S31) providing a substrate 100 with a first insulating layer 122 and a second insulating layer 124 stacked on a surface of the substrate 100;

(S32) exposing a part surface of the substrate 100 by etching the first insulating layer 122 and the second insulating layer 124;

(S33) forming a plurality of grooves 102 and a plurality of bulges 104 by etching the exposed surface of the substrate 100;

(S34) coating a third insulating layer 126 on the plurality of grooves 102 and the plurality of bulges 104;

(S35) locating a first electrode 106 and a second electrode 116 on the third insulating layer 126 on the plurality of bulges 104; and (S36) placing a sound wave generator 110 to electrically connect to the first electrode 106 and the second electrode 116.

The method of making thermoacoustic device 30 is similar to that of making thermoacoustic device 10, except that forming the multi-layer insulating layer 120 on the substrate 100.

In the step (S31), the first insulating layer 122 and the second insulating layer 124 can be deposited on the substrate 100 via chemical vapor deposition. The first insulating layer 122 functions as a buffer layer to deposit the second insulating layer 124, and the quality of the second insulating layer 124 can be improved. The sound effect of the thermoacoustic device 30 can be improved.

In step (S32), the first insulating layer 122 and the second insulating layer 124 can be etched through a mask layer (not shown). The mask layer defines a plurality of through holes, and the first insulating layer 122 and the second insulating layer 124 is etched through the plurality of through holes. The surface of the substrate 100 corresponding to the plurality of though holes will be exposed. The shape of the through hole can be rectangular.

In step (S33), the plurality of grooves 102 and the plurality of bulges 104 will be formed on the substrate 100, and the first insulating layer 122 and the second insulating layer 124 are merely deposited on the plurality of bulges 104.

In step (S34), the third insulating layer 126 is a single layer. The third insulating layer 126 is continuously deposited on the surface of the plurality of grooves 102 and the plurality of bulges 104.

Figure 11:
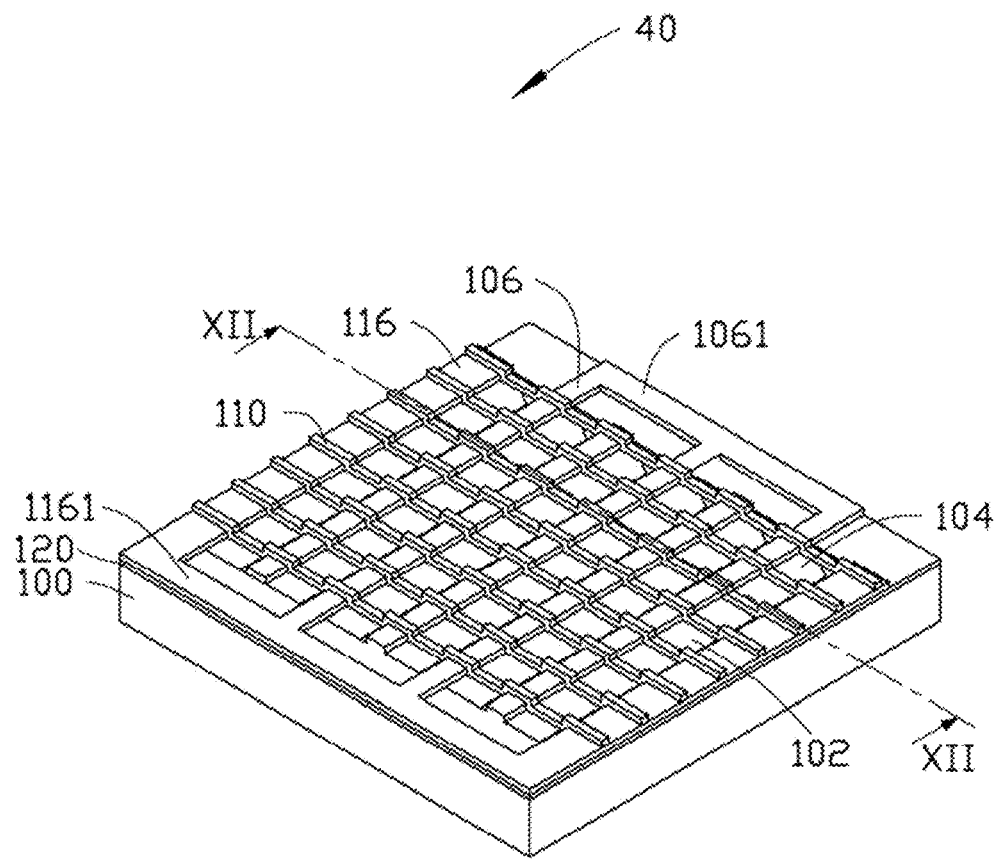
FIG. 11 is a schematic view of another embodiment of a thermoacoustic device.
Figure 12:
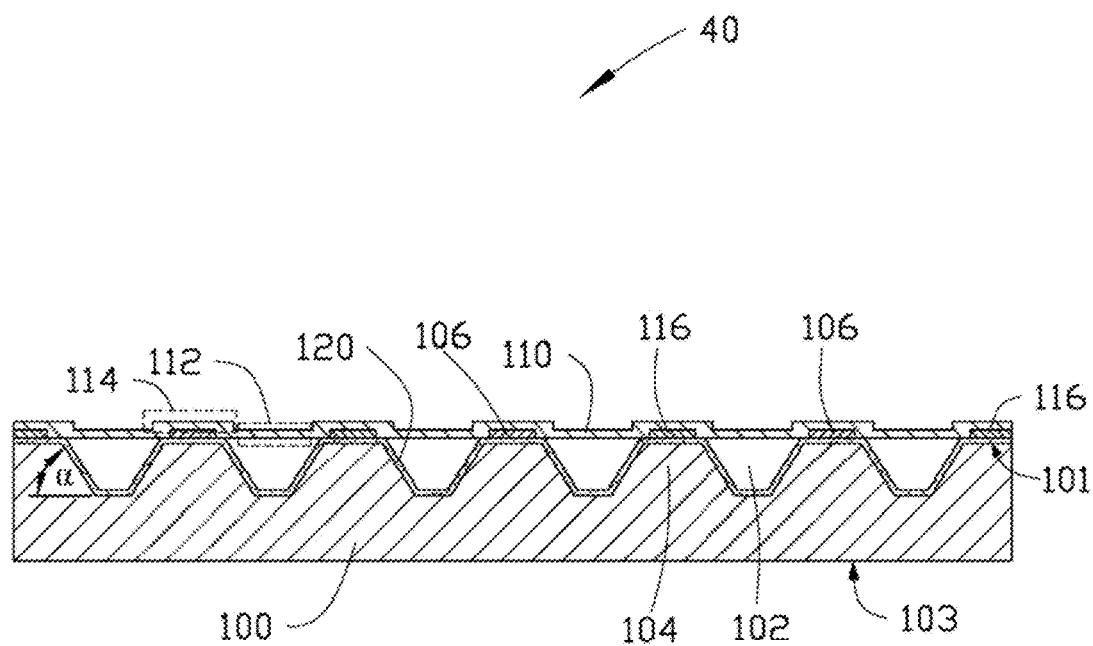
FIG. 12 is a cross-section view, along a line XII-XII of FIG. 11.
Figure 13:
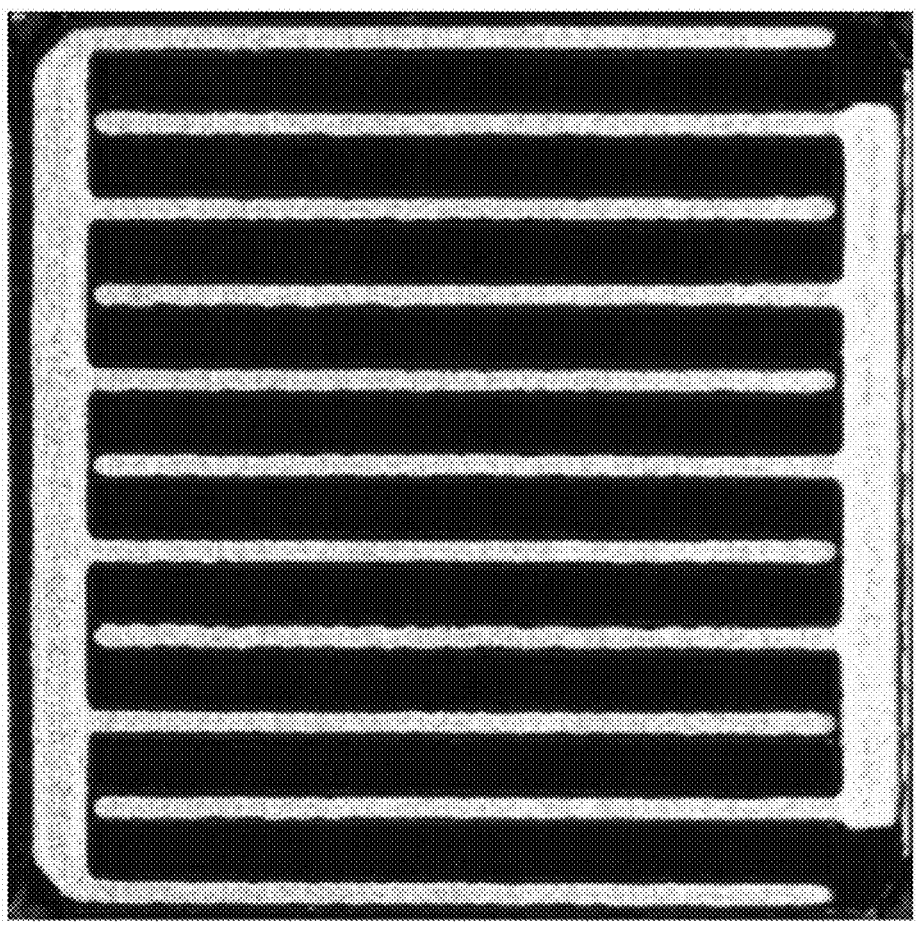
FIG. 13 is a schematic view of another embodiment of a thermoacoustic device.

Referring to FIGS. 11-13, a thermoacoustic device 40 includes a thermoacoustic device 30 includes a substrate 100, a sound wave generator 110, an insulating layer 120, a plurality of first electrodes 106, and a plurality of second electrodes 116. The substrate 100 includes a first surface 101 and a second surface 103 opposite to the first surface 101. The first surface 101 defines a plurality of grooves 102, and a bulge 104 is formed between the adjacent two grooves 102. The insulating layer 120 is a multi-layer structure and located on the first surface 101. The sound wave generator 110 is located on the insulating layer 120 and insulated from the substrate 100. The sound wave generator 110 defines a first portion 112 and a second portion 114. The first portion 112 is suspended on the plurality of grooves 102. The second portion 114 is attached on the bulge 104.

The structure of thermoacoustic device 40 is similar to that of the thermoacoustic device 10, except that the thermoacoustic device 40 includes the plurality of first electrodes 106 and the plurality of second electrodes 116.

The plurality of first electrodes 106 and the plurality of second electrodes 116 can be arranged as a staggered manner of "a-b-a-b-a-b . . . ". All the plurality of first electrodes 106 are electrically connected together, and all the plurality of second electrodes 116 are electrically connected together, whereby the sections of the sound wave generator 110 between the adjacent first electrode 106 and the second electrode 116 are in parallel. An electrical signal is conducted in the sound wave generator 110 from the plurality of first electrodes 106 to the plurality of second electrodes 116. By placing the sections in parallel, the resistance of the thermoacoustic device is decreased. Therefore, the driving voltage of the thermoacoustic device can be decreased with the same effect.

The plurality of first electrodes 106 and the plurality of second electrodes 116 can be substantially parallel to each other with a same distance between the adjacent first electrode 106 and the second electrode 116. The plurality of the plurality of first electrodes 106 and the plurality of second electrodes 116 are alternatively located on the plurality of bulges 104. The sound wave generator 110 between adjacent first electrodes 106 and the second electrodes 116 is suspended above the plurality of grooves 102.

To connect all the plurality of first electrodes 106 together, and connect all the plurality of second electrodes 116 together, first conducting member 1061 and second conducting member 1161 can be arranged. All the plurality of first electrodes 106 are connected to the first conducting member 1061. All the plurality of second electrodes 116 are connected to the second conducting member 1161. The sound wave generator 110 is divided by the plurality of first electrodes 106 and the plurality of and second electrodes 116 into many sections. The sections of the sound wave generator 110 between the adjacent first electrode 106 and the second electrode 116 are in parallel. An electrical signal is conducted in the sound wave generator 110 from the plurality of first electrodes 106 to the plurality of second electrodes 116.

The first conducting member 1061 and the second conducting member 1161 can be made of the same material as the first electrode 106 and the plurality of second electrodes 116, and can be perpendicular to the first electrodes 106 and the plurality of second electrodes 116.

Figure 14:
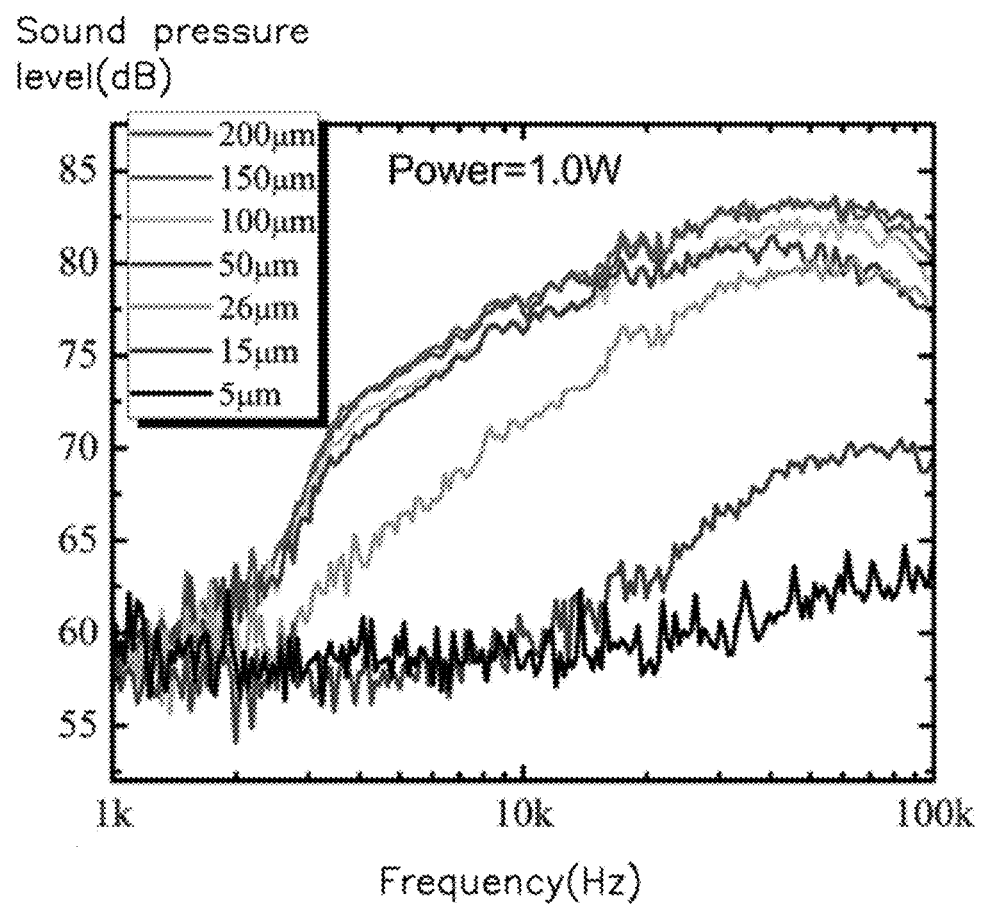
FIG. 14 shows a sound pressure level-frequency curve of the thermoacoustic device of FIG. 13.
Figure 15:
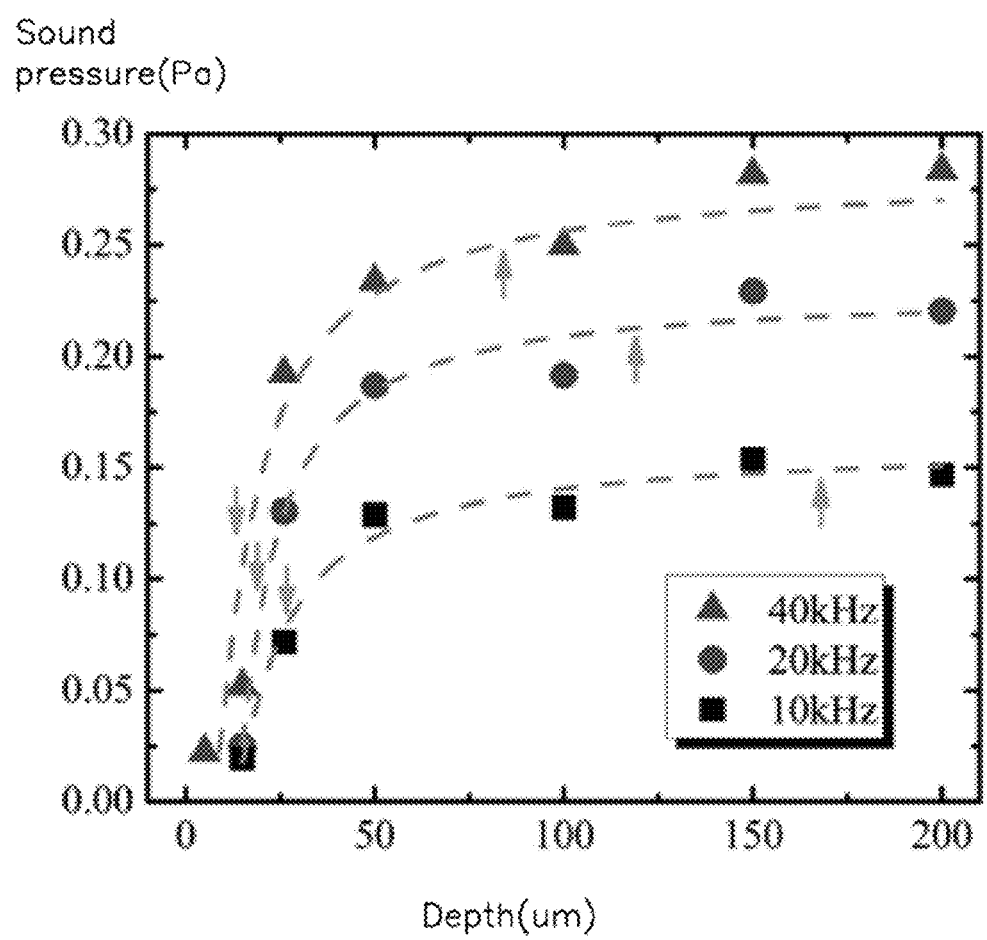
FIG. 15 shows a schematic view of acoustic effect of the thermoacoustic device of FIG. 13.

Referring to FIG. 14-15, the sound effect of the thermoacoustic device 20 is related to the depth of the plurality of grooves 102. In one embodiment, the depth of the plurality of grooves 102 ranges from about 100 micrometers to about 200 micrometers. Thus in the frequency band for which the human can hear, the thermoacoustic device 40 have excellent thermal wavelength. Therefore, the thermoacoustic device 40 still has a good sound effects even for its small size.

Figure 16:
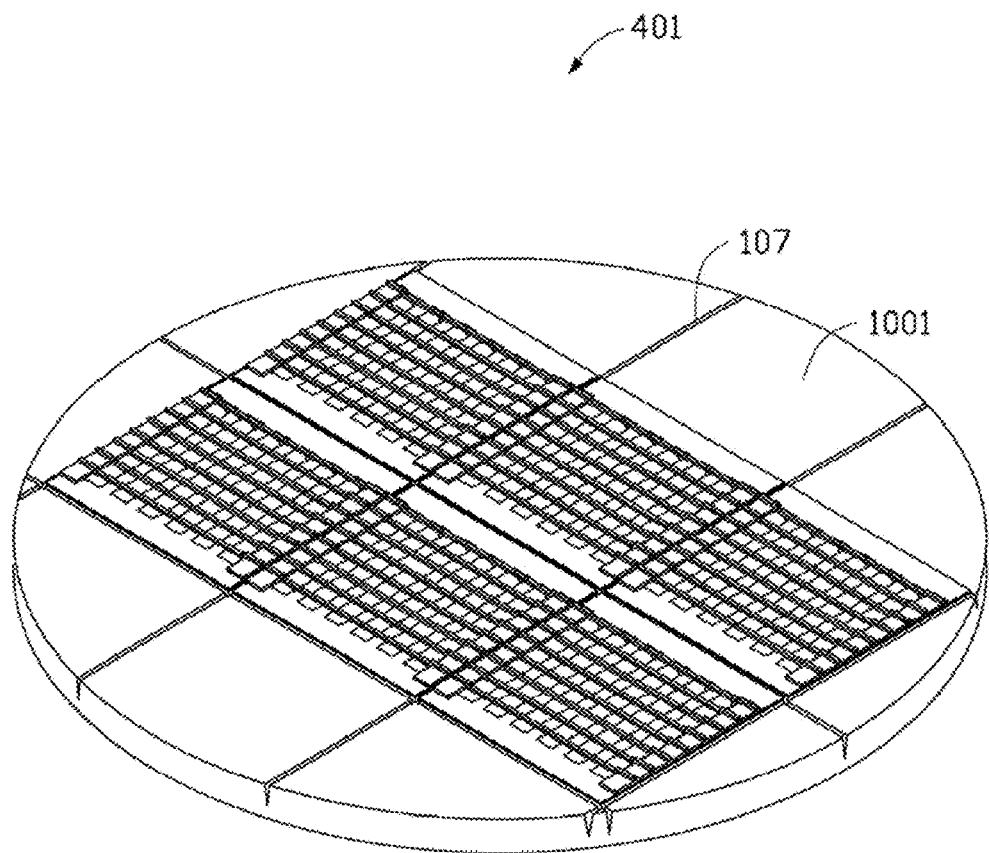
FIG. 16 shows a schematic view of a thermoacoustic device array in the method of FIG. 11.

Referring to FIG. 16, one embodiment of a method for making thermoacoustic device 40 includes following steps:

(S41) providing a base 1001 having a first surface 101, wherein the first surface 101 defines a plurality of grids;

(S42) forming a plurality of grooves 102 parallel with and spaced from each other in each of the plurality of grids;

(S43) applying at least one first electrode 106 and at least one second electrode 116 spaced from each other in each grid, and at least one groove 102 is located between the at least one electrode 106 and the at least one second electrode 116;

(S44) placing a sound wave generator 110 on the substrate 100, wherein the sound wave generator 110 covers the plurality of grids and electrically connects to the at least one first electrode 106 and the second electrode 116, and the sound wave generator 110 is suspended above the plurality of grooves 102;

(S45) forming a thermoacoustic device array 401 by separating the sound wave generator 110 according to the plurality of grids, and the adjacent two grids are insulated from each other; and (S46) forming a plurality of thermoacoustic device 40 by cutting the base 1001.

In step (S41), the plurality of grids can be defined by a plurality of cutting lines 107. The plurality of cutting lines 107 can be formed on the base 1001 by etching method. The arrangement of the cutting lines 107 can be selected according to the shape of the thermoacoustic device 40. In one embodiment, the plurality of cutting lines 107 is intersected with each other, and the base 1001 is divided into a plurality of rectangular grids.

In step (S45) and step (S46), the sound wave generator 110 and the base 1001 can be cut along the plurality of cutting lines 107. Thus each of the plurality of grids forms a thermoacoustic device 40.

Furthermore, the step (S41) and the step (S42) can be preformed in one step. The plurality of grooves 102 and the plurality of cutting lines 107 can be formed at the same time. The plurality of thermoacoustic device 40 can be fabricated at the same time, thus the productivity of the thermoacoustic device 40 can be increased.

Figure 17:
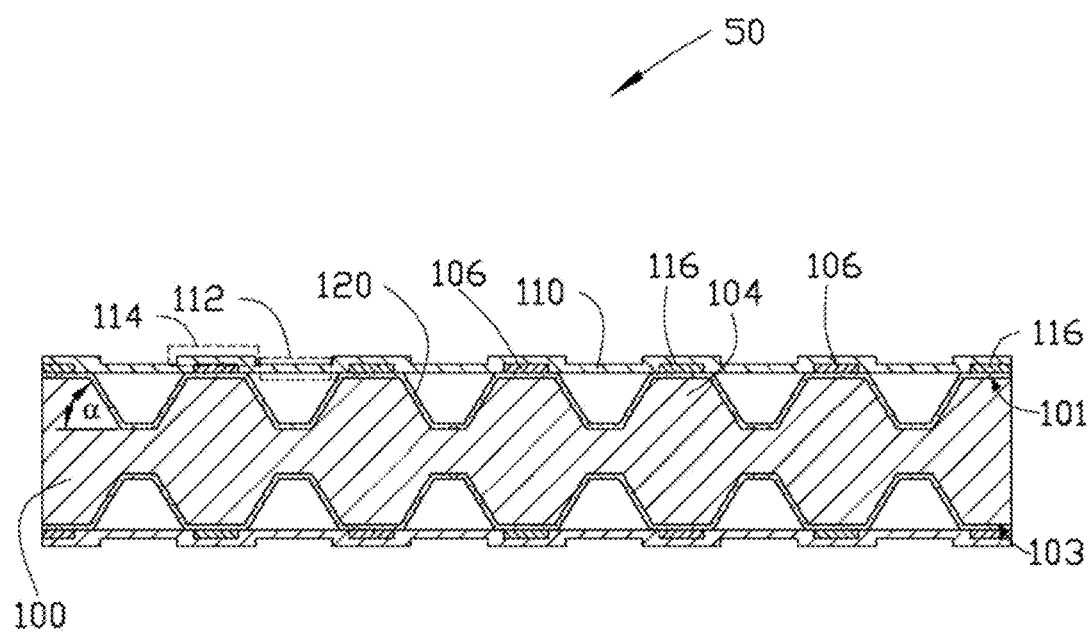
FIG. 17 is a schematic view of another thermoacoustic device.

Referring to FIG. 17, a thermoacoustic device 50 a thermoacoustic device 30 includes a substrate 100, a sound wave generator 110, an insulating layer 120, a plurality of first electrodes 106, and a plurality of second electrodes 116. The substrate 100 includes a first surface 101 and a second surface 103, opposite to the first surface 101. Both the first surface 101 and the second surface 103 defines a plurality of grooves 102, and a bulge 104 is formed between the adjacent two grooves 102.

The structure of the thermoacoustic device 50 is similar to that of the thermoacoustic device 10 except that both the first surface 101 and the second surface 103 defines a plurality of grooves 102, and the sound wave generator 110 is located both on the first surface 101 and the second surface 103.

The plurality of grooves 102 on the first surface 101 and the second surface 103 can be parallel with each other, or intersected with each other. The sound wave generator 110 on the first surface 101 and the second surface 103 can be driven at the same time to improve sound effects such as volume, stereo effect. While the sound wave generator 110 on the first surface 101 cannot work normally, the sound wave generator 110 on the second surface 103 can still work. Thus the lifespan of the thermoacoustic device 50 can be prolonged.

The method of making thermoacoustic device 50 can be similar to that of making thermoacoustic device 10, except that further includes a step of forming a plurality of grooves 102 on the second surface 103 of the substrate 100, and locating the sound wave generator 110 both on the first surface 101 and the second surface 103.

Figure 18:
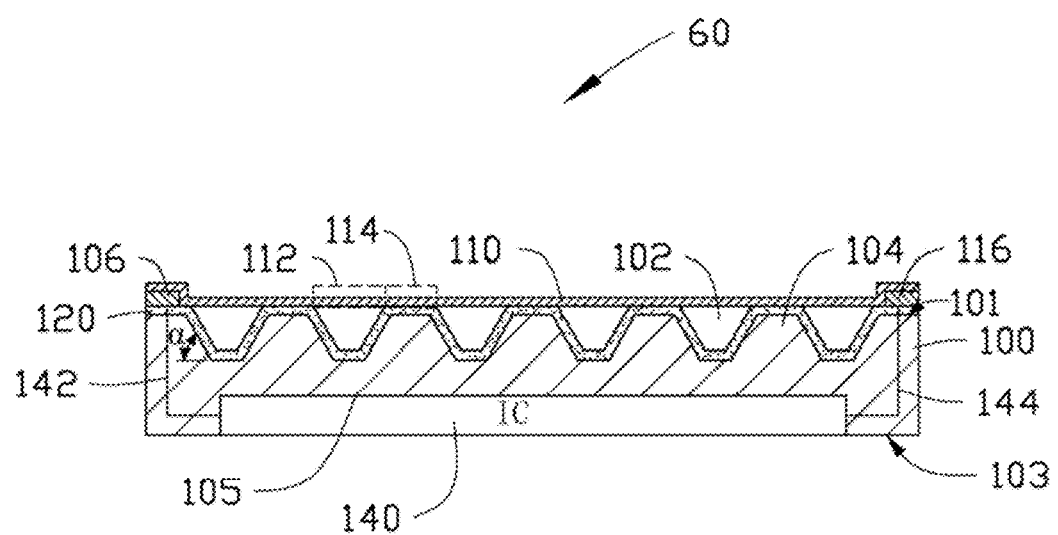
FIG. 18 is a schematic view of another thermoacoustic device.

Referring to FIG. 18, a thermoacoustic device 60 includes a thermoacoustic device 30 includes a substrate 100, a sound wave generator 110, an insulating layer 120, a plurality of first electrodes 106, and a plurality of second electrodes 116.

The substrate 100 includes a first surface 101 and a second surface 103 opposite to the first surface 101. The first surface 101 defines a plurality of grooves 102, and a bulge 104 is formed between the adjacent two grooves 102. The second surface 103 defines a cavity 105, and an integrated circuit chip 140 is received into the cavity 105. The insulating layer 120 is a multi-layer structure and located on the first surface 101. The sound wave generator 110 is located on the insulating layer 120 and insulated from the substrate 100. The sound wave generator 110 defines a first portion 112 and a second portion 114. The first portion 112 is suspended on the plurality of grooves 102. The second portion 114 is attached on the bulge 104.

The structure of thermoacoustic device 60 is similar to that of the thermoacoustic device 10, except that the substrate 100 further defines the cavity 105 on the second surface 103, and the integrated circuit chip 140 is received into the cavity 105.

The material of the substrate 100 can be silicon, thus the integrated circuit chip 140 can be directly integrated onto the substrate 100. In one embodiment, the thermoacoustic device 60 further includes a third electrode 142 and a fourth electrode 144. The third electrode 142 and the fourth electrode 144 are used to apply audio signal from the integrated circuit chip 140 into the sound wave generator 110. The third electrode 142 and the fourth electrode 144 are insulated from the substrate 100. The third electrode 142 can be electrically connected to the first electrode 106 and the integrated circuit chip 140, and the fourth electrode 144 can be electrically connected to the second electrode 116 and the integrated circuit chip 140.

Furthermore, the integrated circuit chip 140 can also be located on the first surface 101, thus the third electrode 142 and the fourth electrode 144 can be avoided. The material of the substrate 100 is silicon, thus the integrated circuit chip 140 can be directly integrated into the substrate 100, and the size of the thermoacoustic device 60 can be reduced. Furthermore, the substrate 100 has better thermal conductivity, thus the heat can be effectively conducted out of the thermoacoustic device 60, and distortion of the sound wave can be reduced.

A method of making thermoacoustic device 60 includes following steps:

(S61) providing a substrate 100 with a first surface 101 and an opposite second surface 103;

(S62) forming a plurality of grooves 102 on the first surface 101 to form a patterned surface, and a bulge 104 is formed between each two adjacent grooves 102;

(S63) forming an insulating layer 120 on the patterned surface of the substrate 100;

(S64) locating a first electrode 106 and a second electrode 116 on the insulating layer 120, wherein the first electrode 106 and the second electrode 116 is spaced from each other;

(S65) placing a sound wave generator 110 on the insulating layer 120 and electrically connected to the first electrode 106 and the second electrode 116; and (S66) applying a integrated circuit chip 140 on the second surface 103 and electrically connected to the sound wave generator 110.

The method of making thermoacoustic device 60 is similar to that of making thermoacoustic device 10, except that further includes a step of forming the integrated circuit chip 140 on the second surface 103.

In step (S66), the integrated circuit chip 140 can be integrated into the substrate 100. In one embodiment, a cavity 105 can be formed on the second surface 103, and the integrated circuit chip 140 can be received into the cavity 105. Furthermore, the material of the substrate 100 can be silicon, thus the integrated circuit chip 140 can be fabricated on the second surface 103 with traditional microelectronics process such as epitaxial technology, diffusion technology, ion implantation doping, oxide process, lithography process, or depositing process. Thus the method of making thermoacoustic device 60 can be simple, and low in price.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the invention. Variations may be made to the embodiments without departing from the spirit of the invention as claimed. Any elements discussed with any embodiment are envisioned to be able to be used with the other embodiments. The above-described embodiments illustrate the scope of the invention but do not restrict the scope of the invention.

What is claimed is:

1. A method for making thermoacoustic device comprising:
   providing a silicon substrate having a first surface and second surface that is opposite to the first surface;
   patterning the first surface to form a patterned surface by forming a plurality of grooves substantially oriented along a first direction on the first surface of the silicon substrate; wherein the plurality of grooves is spaced from each other, a bulge is located between each adjacent two of the plurality of grooves, and a depth of each of the plurality of grooves ranges from about 100 micrometers to about 200 micrometers;
   coating an insulating layer on the patterned surface;
   forming a first electrode and a second electrode on the insulating layer, wherein the first electrode and the second electrode are spaced from each other;
   applying a carbon nanotube structure on the insulating layer; wherein the carbon nanotube structure is electrically connected to the first electrode and the second electrode, and the carbon nanotube structure is suspended above the plurality of grooves; and the carbon nanotube structure comprises a carbon nanotube film, and the carbon nanotube film comprises a plurality of carbon nanotubes substantially oriented along a second direction; wherein the second direction intersects with the first direction; and
   treating the carbon nanotube film after the applying the carbon nanotube structure on the insulating layer, wherein the treating the carbon nanotube film comprises:
   forming a plurality of parallel carbon nanotube belts spaced from each other by cutting the carbon nanotube film along the second direction; and
   shrinking the plurality of parallel carbon nanotube belts onto said plurality of grooves with organic solution.

2. The method of claim 1, wherein the first surface of the silicon substrate is patterned by etching the first surface via a dry etching method or wet etching method.

3. The method of claim 2, wherein etching the first surface of the silicon substrate comprises following substeps:
   locating a mask layer on the first surface of the silicon substrate;
   etching the first surface with an etching solution; and
   removing the mask layer.

4. The method of claim 3, wherein the mask layer defines a plurality of through holes, and the plurality though holes is parallel with and spaced from each other.

5. The method of claim 1, wherein a width of each of the plurality of grooves ranges from about 0.2 mm to about 1 mm in the step of etching the first surface.

6. The method of claim 1, wherein the carbon nanotube structure is free-standing and directly attached to the insulating layer in the step of applying the carbon nanotube structure on the insulating layer.

7. The method of claim 1, wherein the carbon nanotube film is cut along a plurality of cutting lines extending along the second direction.

8. The method of claim 1, wherein the carbon nanotube structure defines a first portion and a second portion, the first portion is suspended above the plurality of grooves, and the second portion is attached on the bulge.

9. The method of claim 1, further comprising a step of integrating an integrated circuit chip on the second surface of the silicon substrate via microelectronic process.

* * * * *